(12) United States Patent
Nicholas et al.

(10) Patent No.: US 9,505,621 B2
(45) Date of Patent: Nov. 29, 2016

(54) SYNTHESIS OF LENGTH-SELECTED CARBON NANOTUBES

(71) Applicant: NanoLab, Inc., Waltham, MA (US)

(72) Inventors: Nolan Nicholas, Milford, MA (US); David Carnahan, Needham, MA (US)

(73) Assignee: NanoLab, Inc., Waltham, MA (US)

( * ) Notice: Subject to any disclaimer, the term of this patent is extended or adjusted under 35 U.S.C. 154(b) by 0 days.

(21) Appl. No.: 14/219,859

(22) Filed: Mar. 19, 2014

(65) Prior Publication Data

US 2014/0286852 A1    Sep. 25, 2014

Related U.S. Application Data

(60) Provisional application No. 61/803,151, filed on Mar. 19, 2013.

(51) Int. Cl.
*C01B 31/02* (2006.01)
*B82Y 40/00* (2011.01)
*B82Y 30/00* (2011.01)

(52) U.S. Cl.
CPC ............. *C01B 31/028* (2013.01); *B82Y 40/00* (2013.01); *C01B 31/0226* (2013.01); *B82Y 30/00* (2013.01); *C01B 2202/34* (2013.01); *C01B 2202/36* (2013.01); *Y10S 977/742* (2013.01); *Y10S 977/842* (2013.01); *Y10S 977/847* (2013.01)

(58) Field of Classification Search
CPC ............ C01B 31/028; C01B 31/0226; C01B 2202/36; C01B 2202/34; B82Y 40/00; B82Y 30/00; Y10S 977/742; Y10S 977/842; Y10S 977/847

USPC ........ 423/447.1–447.3, 445 B; 977/742–754, 977/842–848

See application file for complete search history.

(56) References Cited

U.S. PATENT DOCUMENTS

| | | | |
|---|---|---|---|
| 6,940,088 B2 * | 9/2005 | Silverbrook | B82Y 10/00 257/14 |
| 7,157,068 B2 | 1/2007 | Li et al. | |
| 2005/0002850 A1 * | 1/2005 | Niu et al. | 423/447.1 |
| 2005/0191417 A1 * | 9/2005 | Fan et al. | 427/248.1 |
| 2008/0093211 A1 * | 4/2008 | Ramanath et al. | 204/157.63 |
| 2012/0041153 A1 * | 2/2012 | Nicholas | B82Y 30/00 525/333.2 |
| 2012/0071610 A1 | 3/2012 | Nicholas | |
| 2013/0153855 A1 * | 6/2013 | Afzali-Ardakani et al. | 257/9 |

OTHER PUBLICATIONS

Lee, et al., Synthesis of bamboo-shaped carbon-nitrogen nanotubes using C2H2—NH3—Fe(CO)5 system, Chemical Physics Letters 2002; 359: 115-120.*
Ziegler, et al., Cutting single-walled carbon nanotubes, Nanotechnology 2005; 16: S539-S544.*

(Continued)

*Primary Examiner* — Daniel C McCracken
(74) *Attorney, Agent, or Firm* — Pandiscio & Pandiscio

(57) ABSTRACT

A method for producing carbon nanotubes having specific lengths, said method comprising:
producing carbon nanotubes having at least two types of zones along their lengths, wherein each zone type has a characteristic structure that confers specific properties; and
processing said carbon nanotubes to selectively attack one zone type more aggressively than another zone type.

24 Claims, 4 Drawing Sheets

(56) References Cited

OTHER PUBLICATIONS

Koos, et al., Comparison of structural changes in nitrogen and boron-doped multi-walled carbon nanotubes, Carbon 2010; 48: 3033-3041.*

Ajayan et al., Single-Walled Carbon Nanotube-Polymer Composites: Strength and Weakness: Advanced Materials, 2000, vol. 12, No. 10, pp. 750-753.

Ali-Boucetta et al., Asbestos-Like Pathogenicity of Long Carbon Nanotubes Alleviated by Chemical Functionalization, Angew. Chem. Int. Ed., 2013, vol. 52, pp. 1-6.

Bakshi et al., Carbon Nanotube Reinforced Metal Matrix Composites—A Review, International Materials Reviews, 2010, vol. 55, No. 1, pp. 41-64.

Bepete et al., The Use of Aliphatic Alcohol Chain Length to Control the Nitrogen Type and Content in Nitrogen Doped Carbon Nanotubes, Carbon, 2013, vol. 52, pp. 316-325.

Bokobza, Multiwall Carbon Nanotube Elastomeric Composites: A Review, Polymer, 2007, vol. 48, pp. 4907-4920.

Bom et al., Thermogravimetric Analysis of the Oxidation of Multiwalled Carbon Nanotubes: Evidence for the Role of Defect Sites in Carbon Nanotube Chemistry, Nano Letters, 2002 vol. 2, pp. 615-619.

Breuer et al., Big Returns From Small Fibers: A Review of Polymer/Carbon Nanotube Composites, Polymers Composites, 2004, vol. 25, No. 6, pp. 630-645.

Burke et al., Quantitative Theory of Nanowire and Nanotube Antenna Performance, IEEE Trans. Nanotech., 2006, vol. 5, pp. 314-334.

Chen et al., Carbon Nanotobe-Based Functional Materials for Optical Limiting, Journal of Nanoscience and Nanotechnology, 2007, vol. 7, pp. 1268-1283.

Coleman et al., High-Performance Nanotube-Reinforced Plastics: Understanding the Mechanism of Strength Increase, Advanced Functional Materials, 2004, vol. 14, No. 8, pp. 791-798.

Datsyuk et al., Chemical Oxidation of Multiwalled Carbon Nanotubes, Carbon, 2008, vol. 46, pp. 833-840.

Ewels et al., A Review of Nitrogen Doping in Carbon Nanotubes, Journal of Nanoscience & Nanotechnology, 2005, vol. 5, No. 9, pp. 1345-1363.

Fang et al., Effects of Gas Composition on the Growth of Multi-Walled Carbon Nanotube, Applied Surface Science, 2007, vol. 253, pp. 8749-8753.

Frankland et al., Molecular Simulation of the Influence of Chemical-Links on the Shear Strength of Carbon Nanotube-Polymer Interfaces, The Journal of Physical Chemistry, 2002, vol. 106, No. 12, pp. 3046-3048.

Harris, Carbon Nanotube Composites, International Materials Reviews, 2004, vol. 49, No. 1, pp. 31-43.

Hou et al., Multi-Step Purification of Carbon Nanotubes, Carbon, 2002, vol. 40, pp. 81-85.

Kempa et al., Carbon Nanotubes as Optical Antennae, Advanced Materials, 2007, vol. 19, pp. 421-426.

Ko et al., Purification of Multi-Walled Carbon Nanotubes Through Microwave Heating of Nitric Acid in a Closed Vessel, Carbon, 2005, vol. 43, pp. 727-733.

Konya et al., End Morphology of Ball Milled Carbon Nanotubes, Carbon, 2004, vol. 42, pp. 2001-2008.

Kornyushin et al., On the Frequencies of Collective Electron Oscillations in Nanotubes, Contemporary Physics, 2001, vol. 42, No. 3, pp. 159-165.

Kostarelos, The Long and Short of Carbon Nanotube Toxicity, Nature Biotechnology, 2008, vol. 26, No. 7, pp. 774-776.

Kukovecz et al., Long-Time Low-Impact Ball Milling of Multi-Walled Carbon Nanotubes, Carbon, 2005, vol. 43, pp. 994-1000.

Lee et al., Synthesis of Bamboo-Shaped Carbon-Nitrogen Nanotubes Using C2H2—NH3—Fe(CO)5 System, Chemical Physics Letters, 2002, vol. 359, pp. 115-120.

Lee et al., Temperature Effect on the Growth of Carbon Nanotubes Using Thermal Chemical Vapor Deposition, Chemical Physics Letters, 2001, vol. 343, pp. 33-38.

Liu et al., Fullerene Pipes, Science, 1998, vol. 280, pp. 1253-1256.

McKee et al., Thermogravimetric Analysis of Synthesis Variation Effects on CVD Generated Multiwalled Carbon Nanotubes. The Journal of Physical Chemistry B, 2006, vol. 110, No. 3, pp. 1179-1186.

Nerushev et al., The Temperature Dependence of Fe-Catalyzed Growth of Carbon Nanotubes on Silicon Substrates, Physica B, 2002, vol. 323, pp. 51-59.

Park et al., Inter-Collisional Cutting of Multi-Walled Carbon Nanotubes by High-Speed Agitation, Journal of Physics and Chemistry of Solids, 2008, vol. 69, No. 10, pp. 2481-2486.

Pierard et al., Production of Short Carbon Nanotubes with Open Tips by Ball Milling, Chemical Physics Letters, 2001, vol. 335, pp. 1-8.

Pillai et al., Surface Plasmon Enhanced Silicon Solar Cells, Journal of Applied Physics, 2007, vol. 101, pp. 093105.

Pint et al., Supergrowth of Nitrogen-Doped Single-Walled Carbon Nanotube Arrays: Active Species, Dopant Charaterization, and Doped/Undoped Heterojunctions, ACS Nano, 2011, vol. 5, No. 9, pp. 6925-6934.

Pint et al., Synthesis of High Aspect-Ratio Carbon Nanotube "Flying Carpets" From Nanostructured Flake Substrates, Nano Letters, 2008, vol. 8, pp. 1879-1883.

Rubio et al., Ball-Milling Modification of Single-Walled Carbon Nanotubes: Purification, Cutting, and Functionalization, Small, 2011, vol. 7, No. 5, pp. 665-674.

Sun et al., Broadband Optical Limiting with Multiwalled Carbon Nanotubes, Applied Physics Letters, 1998, vol. 73, No. 25, pp. 3632-3834.

Tran et al., Thermal Oxidative Cutting of Multi-Walled Carbon Nanotubes, Carbon, 2007, vol. 45, pp. 2341-2350.

Tsang et al., Thinning and Opening of Carbon Nanotubes by Oxidation Using Carbon Dioxide, Nature, 1993, vol. 362, pp. 520-522.

Wang et al., Optical Emission Spectroscopy Study of the Influence of Nitrogen on Carbon Nanotube Growth, Carbon, 2003, vol. 41, pp. 1827-1831.

Wang et al., Receiving and Transmitting Light-Like Radio Waves: Antenna Effect in Arrays of Aligned Carbon Nanotubes, Applied Physics Letters, 2004, vol. 85, No. 13, pp. 2607-2609.

Xu et al., Vertical Array Growth of Small Diameter Single-Walled Carbon Nanotubes, J. Am. Chem. Soc., 2006, vol. 128, pp. 6560-6561.

Zhang et al., Vertically Aligned Carbon Nanotube Arrays Grown on a Lamellar Catalyst by Fluidized Bed Catalytic Chemical Vapor Deposition, Carbon, 2009, vol. 47, pp. 2600-2610.

Ziegler et al., Cutting Single-Walled Carbon Nanotubes, Nanotechnology, 2005, vol. 16, pp. S539-S544.

Biris et al., Effect of Hydrogen on the Growth of Morphology of Single Wall Carbon Nanotubes Synthesized on a FeMo/MgO Catalytic System, Physics Letters A, 2008, vol. 372, No. 17, pp. 3051-3057.

Colorado et al., Silica-Coated Single-Walled Nanotubes: Nanostructure Formation, Chemistry of Materials, 2004, vol. 16, No. 14, pp. 2691-2693.

Delale et al., Critical Fiber Length for Load Transfer in Carbon Nanotube (CNT) Reinforced Composites, IMECE2004-60718, 2004, pp. 389-394.

Han et al., Noncovalent Titania Wrapping of Single-Walled Carbon Nanotubes for Environmentally Stable Transparent Conductive Thin Films, Journal of Materials Chemistry, 2010, vol. 20, pp. 8557-8562.

Hao et al., The Effect of Hydrogen on the Formation of Nitrogen-Doped Carbon Nanotubes via Catalytic Pyrolysis of Acetonitrile, Chemical Physics Letters, 2003, vol. 380, pp. 347-351.

Kempa et al.. Dielectric Function of Media Based on Conductive Particles, Physical Review B, 2006, vol. 74, pp. 300-411.

Ko et al., Highly Efficient Microwave-Assisted Purification of Muitwalled Carbon Nanotubes, Microelectronic Engineering, 2004, vol. 73-74, pp. 570-577.

(56) References Cited

OTHER PUBLICATIONS

Koós et al., Effect of the Experimental Parameters on the Structure of Nitrogen-Doped Carbon Nanotubes Produced by Aerosol Chemical Vapour Deposition, Carbon, 2009, vol. 47, No. 1, pp. 30-37.

Lin et al., Effect of Ammonia on the Growth of Carbon Nanotubes, Journal of Nanoscience and Nanotechnology, 2008, vol. 8, No. 5, pp. 2647-2650.

Lin et al., Microwave Makes Carbon Nanotubes Less Defective, ACS Nano, 2010, vol. 4, No. 3, pp. 1716-1722.

Liu et al., Temperature and Flow Rate of NH3 on Nitrogen Content and Doping Environments of Carbon Nanotubes Grown by Injection CVD Method, The Journal of Physical Chemistry B, 2005, vol. 109, No. 33, pp. 15769-15774.

Mahajan et al., Monitoring Structural Defects and Crystallinity of Carbon Nanotubes in Thin Films, Pramana, 2010, vol. 74, No. 3, pp. 447-455.

Meyyappan et al., Carbon Nanotube Growth by PECVD: A Review, Plasma Sources Science and Technology, 2003, vol. 12, pp. 205-216.

Signgh et al., Raman Spectroscopy Study of Growth of Multiwalled Carbon Nano-Tubes Using Plasma Enhanced Chemical Vapour Deposition, ICONSET, 2011.

Vazquez et al., Carbon Nanotubes and Microwaves: Interactions, Responses, and Applications, ACS Nano, 2009, vol. 3, No. 12, pp. 3819-3824.

Wang et al., Etching and Cutting of Multi-Walled Carbon Nanotubes in Molten Nitrate, Corrosion Science, 2011, vol. 53, No. 11, pp. 3754-3770.

Wang et al., Microwave-Induced Rapid Chemical Functionalization of Single-Walled Carbon Nanotubes, Carbon, 2005, vol. 43, No. 5, pp. 1015-1020.

Warakulwit et al., Controlled Purification, Solubilisation and Cutting of Carbon Nanotubes Using Phosphomolybdic Acid, Journal of Materials Chemistry, 2008, vol. 18, pp. 4056-4061.

Whitsitt et al., Silica Coated Single Walled Carbon Nanotubes, Nano Letters, 2003, vol. 3, No. 6, pp. 775-778.

Xu et al., Doped Carbon Nanotube Array with a Gradient of Nitrogen Concentration, Carbon, 2010, vol. 48, pp. 3097-3102.

Yang et al., Absorption Enhancements in Plasmonic Solar Cells Coated with Metallic Nanoparticles, Plasmonics, 2013.

\* cited by examiner

SYNTHESIS OF LENGTH-SELECTED CARBON NANOTUBES

REFERENCE TO PENDING PRIOR PATENT APPLICATION

This patent application claims benefit of prior U.S. Provisional Patent Application Ser. No. 61/803,151, filed Mar. 19, 2013 by Nolan Nicholas et al. for SYNTHESIS OF LENGTH SELECTED CARBON NANOTUBES, which patent application is hereby incorporated herein by reference.

FIELD OF THE INVENTION

This invention relates to nanotubes in general, and more particularly to methods and apparatus for controlling the length of carbon nanotubes.

BACKGROUND OF THE INVENTION

For a variety of applications it may be desirable to fabricate carbon nanotubes having a controlled length. For example, carbon nanotubes having a controlled length can be desirable for optical materials including opto-mechanical systems, optical barcoding, composites, self-assembled nanotube architectures, bio-medical applications, etc.

Although a great many methods are known and reported for carbon nanotube synthesis, these methods are, in general, not well-suited to the production of carbon nanotubes having well controlled length. In particular, these methods are generally not well-suited to the production (in an economically scalable manner) of relatively short carbon nanotubes having a controlled length.

Furthermore, although various methods have been developed and reported for modifying and/or selecting the length of carbon nanotubes after they are grown, such methods are, in general, not well suited to providing scalable quantities of well-tailored carbon nanotube materials. In the prior art, long nanotubes are cut by mechanical processes such as ball milling (Chem. Phys Lett 335, 2001, 1-8, Pierard), or by chemical processes such as acid etching (either alone or with sonication) (Science, Vol. 280, 22 May 1998, pp 1253-1256) which exploits defects in the nanotubes so as to cleave them. These and other processes known in the art are not sufficiently length-selective, and produce a poorly controlled distribution of nanotube lengths.

Many applications can benefit from better control of nanotube length. Accordingly, a process by which nanotubes can be created having specific lengths would be advantageous. In addition, it can be desirable to produce length-specific open-ended carbon nanotubes and/or carbon nanotubes with functional end moieties (e.g., oxygen-bearing species) which can be utilized to create site-specific functionalization of the length-specific carbon nanotubes.

SUMMARY OF THE INVENTION

The present invention comprises a method for producing carbon nanotubes having geometrically tailored physical and chemical properties by utilizing a two-stage process. The first stage comprises a method for growing carbon nanotubes having multiple zones along their length with the zones having different lattice characteristics, and the second stage comprises a method for selectively modifying the physico-chemical properties of certain of these zones in the carbon nanotube, while leaving others of these zones affected to a different degree (typically lesser) or quality. In addition, the present invention teaches certain particular applications which are enabled by the tailored nanotubes that are produced by certain embodiments of the present invention. General examples of certain embodiments included in the present invention are provided below to illustrate the principles of this invention without implying any limitation thereto.

In one preferred embodiment, the present invention comprises a method for producing carbon nanotubes with substantially monodisperse controlled length and open ends. In this embodiment of the present invention, carbon nanotubes are synthesized with two types of zones alternating along their length, wherein one type of zone is resistant to the process utilized in the second stage and the other type of zone is susceptible to the process utilized in the second stage, and wherein the synthesis conditions utilized to produce each type of zone create substantially uniform lengths for at least one type of zone. In this embodiment, the second stage consists of a method to selectively attack the structural composition of one of the zone types using physical and/or chemical techniques.

In another preferred embodiment, the present invention comprises a method for producing carbon nanotubes having a plurality of differentiated zones along the length of the nanotube, wherein the number of zone types produced is greater than two (e.g., three). These carbon nanotubes are then subjected to a subsequent chemical process to selectively attack one of the zone types while leaving the other zone types substantially intact. Optionally, the carbon nanotubes may then be subjected to a subsequent chemical process to selectively attack or modify one of the remaining zones of the carbon nanotubes while leaving the other remaining zones substantially intact.

In another preferred embodiment, the present invention comprises a method for producing carbon nanotubes having a plurality of zones along the length of the nanotube, with differentiated physical and chemical surface characteristics. In this embodiment of the invention, carbon nanotubes are synthesized with two or more types of zones alternating along their length, wherein some subset of the zone types is resistant to the process utilized in the second stage and the remainder of the zone types are susceptible to the process utilized in the second stage. In this embodiment of the present invention, the second stage comprises a method to selectively modify the surface chemistry of a subset of the zone types using physical and/or chemical techniques.

In one preferred form of the invention, there is provided a method for producing carbon nanotubes having specific lengths, said method comprising:

producing carbon nanotubes having at least two types of zones along their lengths, wherein each zone type has a characteristic structure that confers specific properties; and processing said carbon nanotubes to selectively attack one zone type more aggressively than another zone type.

In another preferred form of the invention, there is provided a method for producing carbon nanotubes having multiple zones of differing physical and chemical properties along their lengths, said method comprising:

producing carbon nanotubes with at least two types of zones along their lengths;

where at least one zone is chemically functionalized by exposure to chemicals and environments suited to selectively create such functionalization.

In another preferred form of the invention, there is provided a carbon nanotube having at least two differentiated zones of characteristic structure that have undergone selective chemical modification in one or more zones to create zones of chemical functionalization along its length.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts and further wherein.

DETAILED DESCRIPTION OF THE PREFERRED EMBODIMENTS

The present invention comprises a method for producing carbon nanotubes having geometrically tailored physical and chemical properties by utilizing a two-stage process.

Carbon nanotubes having a controlled length can be produced by a sequential process of: (1) growing nanotubes using two or more growth conditions which are iteratively applied during the growth process to create a plurality of differentiated regions along the length of the carbon nanotube with different physico-chemical properties; and (2) cutting and/or otherwise chemically modifying the nanotubes selectively, at certain regions created during the growing process, while maintaining the other regions substantially intact.

During the growth stage (i.e., the first stage) of this two-stage process, carbon nanotubes are grown having a plurality of differentiated regions so that different regions possess different characteristics of the atomic lattice. This process produces carbon nanotubes having differentiated regions, such that some regions possess an atomic lattice which can be readily and selectively attacked, and such that other regions possess an atomic lattice which is more resistant to attack. These types of nanotubes which possess a multiplicity of zones along their length are sometimes referred to herein as "multi-zone carbon nanotubes" (MZNT).

Figure 1:
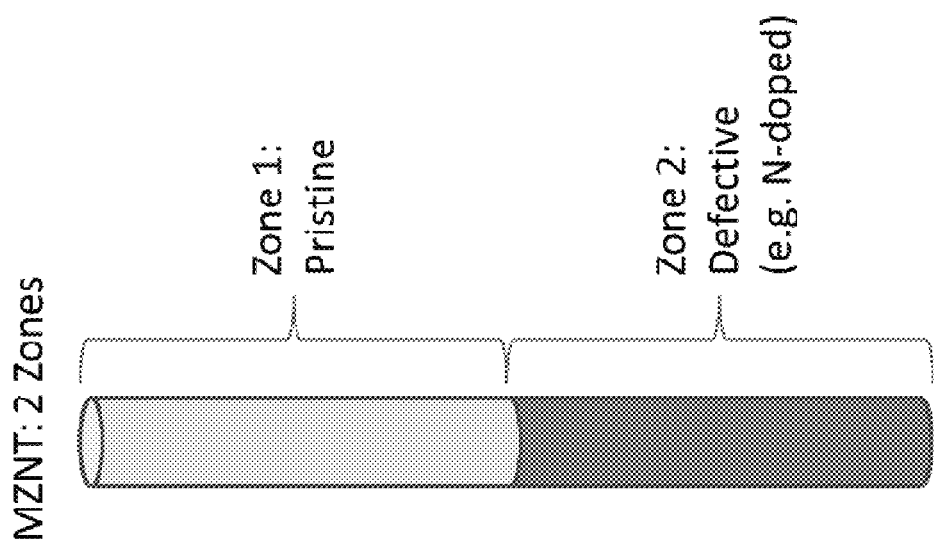
FIG. 1 is a schematic view showing a carbon nanotube having two different types of lattice region.

In one preferred form of the present invention, and looking now at FIG. 1, carbon nanotubes can be produced having two different types of lattice region which alternate in sequence. Each region can be substantially the same length, so as to produce tailored-length carbon nanotubes having substantially the same length after the carbon nanotubes are processed. Lattice regions may be differentiated by differences in topological/structural arrangement and/or by compositional makeup between the various regions. With carbon nanotube materials, deviations away from hexagonally-bonded, six-membered rings composed purely of carbon are commonly referred to as "defects" in the lattice. More particularly, with respect to topological/structural arrangements, the carbon nanotube lattice may be essentially "pristine", in which case the lattice is comprised substantially completely of hexagonally-bonded carbon atoms, free from topological defects such as pentagons or lattice terminations. Alternatively, the carbon lattice may possess substantial concentrations of lattice defects. By way of example but not limitation, such lattice defects can include non-hexagonal-bonded regions, lattice terminations, etc. In the case of compositional defects, different types of atoms can be covalently bonded into the lattice (e.g., different types of atoms can be substituted for carbon atoms in the lattice). For both topological and compositional defects, such defects can selectively enhance (or in certain cases suppress) the susceptibility of the locality at, and surrounding, the defects to particular methods of physical and/or chemical attack.[i] It should be appreciated this definition of multiple "zones" is not intended to refer to the difference between the main body of the carbon nanotube versus the termination sites (e.g., "end-caps") of the carbon nanotube, which all nanotubes of finite length must intrinsically possess. Rather, with respect to the present invention, the term "zones" refers to other sections of lattice having differentiated characteristics which may exist along the length of the carbon nanotube.

Various methods and processes (hereinafter sometimes referred to as "recipes") for growing nanotubes are known and reported in the literature. These methods and recipes include a variety of methods for growing carbon nanotubes having a variety of lattice characteristics. For example, growth recipes have been demonstrated to create lattices which are highly pristine. Other growth recipes produce lattices having high defect concentrations. Several different parameters have been observed to influence the lattice characteristics of the nanotubes grown under those conditions. These relevant parameters include growth temperature, composition and mixture of precursor gases, gas pressure and gas flow rate, etc. By iteratively applying appropriate conditions, carbon nanotubes can be grown having alternating regions of differentiated lattice regions. Examples of relevant parametric changes that can be applied to tailor the lattice characteristics of the nanotubes over its length include: growth temperature,[ii] gas activation techniques (e.g., hot filament growth, plasmas, etc.),[iii] gas precursor composition (including type of carbon source used, presence of dopant sources, presence of secondary reactive gases such as hydrogen or water, and presence of diluent gases—often a single gas may serve more than one function),[iv] gas precursor flow rate,[v] etc. In cases where significant quantities of dopant precursors (e.g., ammonia) are utilized in growth, it is commonly observed that both topological and compositional defects will be incorporated into the nanotube. For example, high quantities of nitrogen doping created by ammonia atmospheres are often observed to be accompanied by defect-based "bamboo" morphologies in the carbon nanotube structure.[vi]

With the present invention, the growth conditions are iteratively cycled during growth between growth conditions which lead to different lattice characteristics of the carbon nanotube materials produced. That is, growth will consist of multiple phases wherein at least two different sets of growth parameters are used and employed in a sequential fashion. Typically this sequence will follow a cyclic pattern so as to produce multiple regions of the same zone type.

Figure 2:
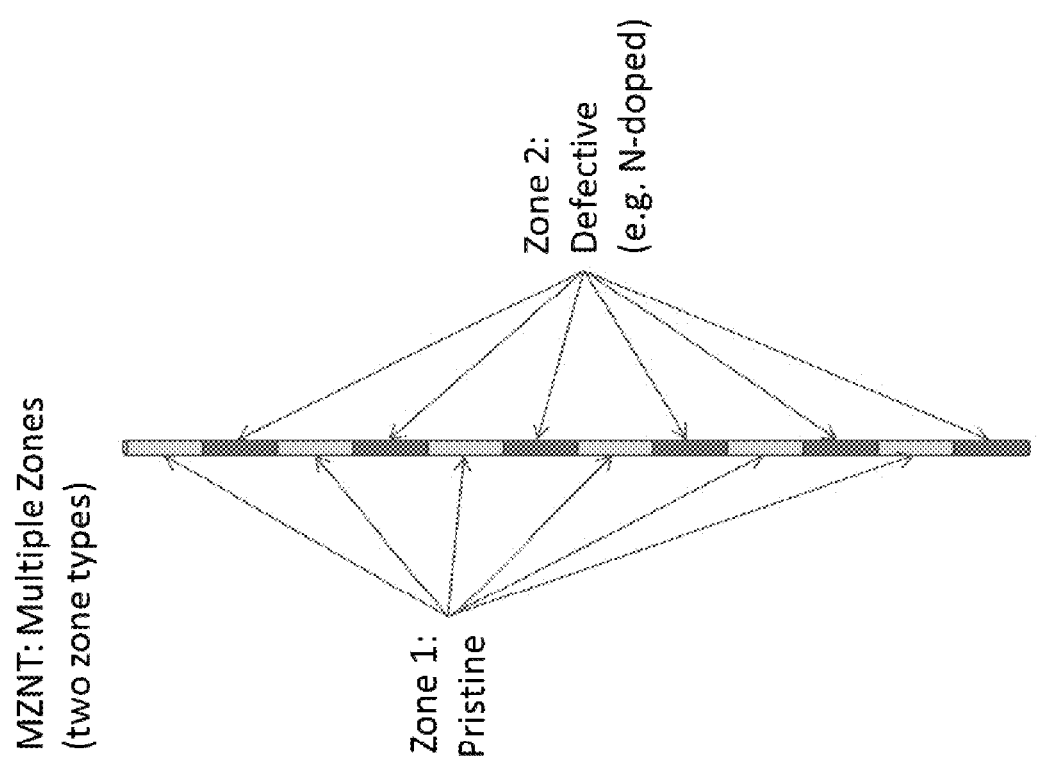
FIG. 2 is a schematic view showing a carbon nanotube having a repetitive sequence of two different types of lattice region.

That is, in one preferred form of the present invention, and looking now at FIG. 2, carbon nanotubes can be produced utilizing a growth stage which comprises a cycle of two growth conditions: a first set of conditions is used to grow carbon nanotubes having a particular lattice type (e.g., "Zone 1: Pristine" "high-quality" lattice) followed by a second set of growth conditions used to grow carbon nanotubes having another particular lattice type (e.g., "Zone 2: Defective (e.g., N-doped) "low-quality" lattice). This cycle may be iteratively repeated as necessary so as to produce multiple zones of each type on the same carbon nanotube. By way of example but not limitation, the growth conditions may be cycled between two different mixtures of precursor gases. For example, the growth conditions may be cycled between a growth gas composition containing substantial amounts of a nitrogen-containing precursor (e.g., acetonitrile) and a growth gas composition that does not contain a significant nitrogen precursor.[vii] This method can be utilized to sequentially create regions of "pristine" and "defective" (e.g., nitrogen-doped) nanotube zones. While the foregoing method for creating carbon nanotubes by cycling between a growth gas composition containing substantial amounts of a nitrogen-containing precursor and a growth gas composition that does not contain a significant nitrogen precursor is known in the art, it is worth noting that the prior art does not combine this method as the first stage of a two-stage process, where the second stage comprises a subsequent selective chemical processing method so as to define the length of the carbon nanotube, and so does not overlap or anticipate the present invention.

Similarly, several different methods are known in the art for attacking the physical/chemical structure of carbon nanotubes, e.g.:

(1) Gas phase oxidation (air, oxygen, water, CO2, etc.)[viii];
(2) Solution & liquid phase oxidation (piranha, sulfuric acid/persulfate, RCA etching, sulfuric/nitric acids, ozone, phosphomolybdic acid, bromine, etc.)[ix];
(3) Molten salt oxidation[x]; and
(4) Mechanical milling/grinding (solution cutting—e.g. ultrasonication, shear cutting).[xi]

These methods (or other methods) can be effacaciously applied (independently or in combination) so as to selectively attack defective lattice regions which are introduced in the growth step (i.e., the first stage, see above) so as to selectively "cut" the nanotube at tailored sites, without introducing undesirable quantities of secondary damage to the nanotube. While the foregoing methods for selectively attacking the physical/chemical structure of carbon nanotubes is known in the prior art, it is worth noting that the prior art does not combine these methods as the second stage of a two-stage process, where the first stage comprises producing carbon nanotubes with alternating regions (e.g., regions of "pristine" and "defective" characteristics), and so does not overlap or anticipate the present invention.

It should be appreciated that optimized cutting methods and conditions will depend upon the nature of differentiation between the defective and non-defective regions. For example, mechanical milling can be particularly effective against regions containing high degrees of topological defects and especially edge-type topological defects (e.g., "bent" regions, "kinked" regions, and/or "bamboo" type nanotubes). Compositional dopant defects (e.g., nitrogen, boron, phosphorus, etc.) will strongly influence local lattice chemical characteristics (e.g., nucleophilicity) and susceptibility to chemical attack (e.g., oxidation) and can be utilized to locally enhance (or suppress) chemical attack. It is known in the art that methods such as these are able to selectively attack different carbonaceous lattice types (e.g., soot versus carbon nanotubes, or pristine versus defective nanotubes) with different efficiencies and rates.[xii]

With the present invention, the particular technique and conditions utilized for the cutting step (i.e., the second stage of the two-stage process) will be chosen so as to provide efficient damage to the nanotube at certain of the lattice regions (e.g., at more defective regions, or regions with dopant characteristics that enhance susceptibility to attack) while being much less aggressive toward other lattice regions (e.g., at pristine regions) and leaving these regions substantially intact. The exact conditions utilized in the selective attack step will, in general, depend upon the exact characteristics of the MZNTs which are to be processed by selective attack. In a preferred form of the present invention, the attack step is optimized so as to maximize the selective efficiency of the attack procedure. This is preferred so as to produce nanotubes with tailored length distributions while maintaining maximal "quality" of the shortened nanotubes produced by the technique.

Additionally, some chemical processing methods for nanotubes are enhanced through the application of electromagnetic radiation.[xiii] For MZNTs, the application of electromagnetic radiation leading to selective input of energy into certain zones of the nanotube can be utilized to enhance the selective reaction process. For example, cutting processes for MZNTs containing both pristine and topologically-defective zones which are subjected to an attack chemistry utilizing an oxidizing environment can be enhanced by applying low frequency (e.g., 10 kHz-100 GHz) electromagnetic fields. Such electromagnetic fields drive electrical currents in the carbon nanotube which resistively heat the nanotubes, with increased heating occurring in regions possessing higher resistivities due to local defect densities. Furthermore, current scattering from defects can induce significant local, non-thermalized excitation of these defects. This localized energy input can be utilized to enhance the rate and selectivity of MZNT processing chemistries.

In some forms of the present invention, the attack procedure can be selected so as to produce particular characteristics in the nanotube terminations which the step generates. By way of example but not limitation, the attack procedure can include:

1. choosing certain oxidizing chemistries to attack defective lattice regions and produce substantial quantities of oxygen-based terminal moieties—such moieties are often desirable for performing secondary processing and functionalization chemistry on carbon nanotubes; and
2. tailoring the defective lattice region characteristics and etching step rate to create an anisotropic attack of the nanotube lattice at defective sites which produces a "beveled" (i.e., conical) geometry of the end termination.

Figure 3:
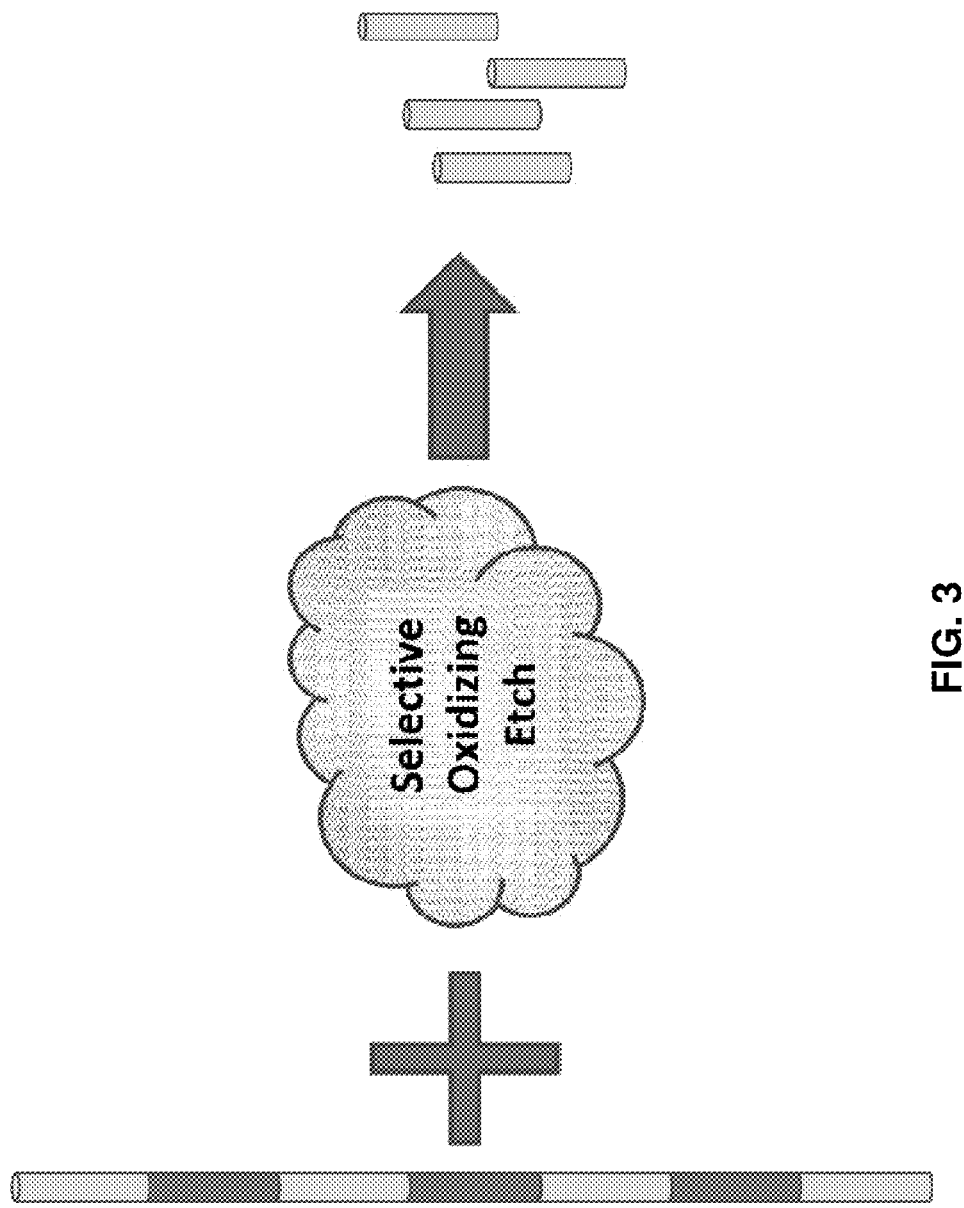
FIG. 3 is a schematic view showing a carbon nanotube being subjected to a selective oxidizing etch.

In some embodiments of the present invention, and looking now at FIG. 3, the cutting steps can comprise in-situ etching of carbon nanotubes adhered to a substrate surface so as to produce CNT-based nanostructures which contain geometrically well-defined nanoscale gaps, which may be useful for certain device applications.

Figure 4:
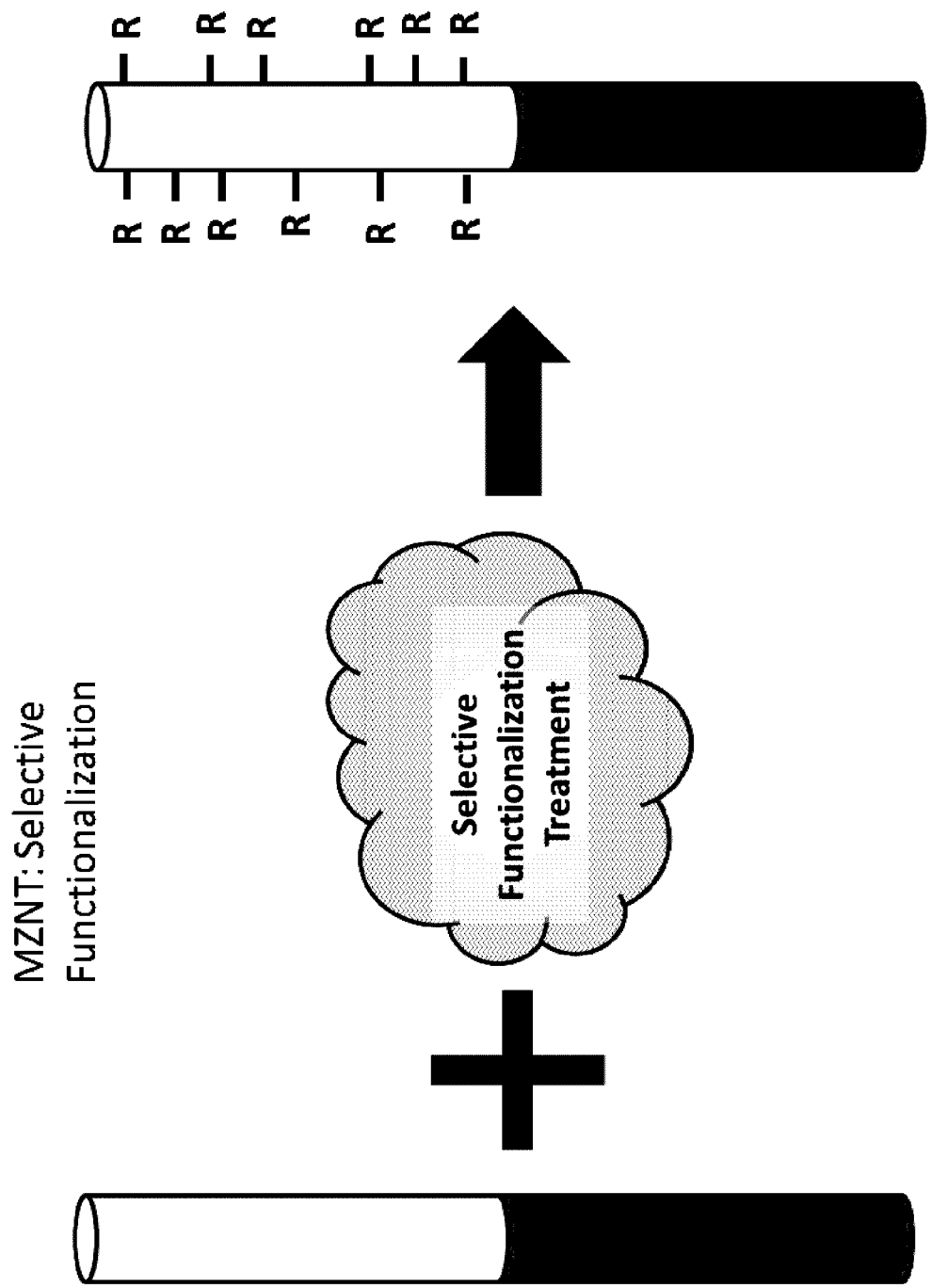
FIG. 4 is a schematic view showing a carbon nanotube being subjected to a selective functionalization treatment.

In some embodiments of the present invention, and looking now at FIG. 4, a "gentler" chemical "attack" step can be utilized so as to selectively modify the chemistry of certain of the synthesized regions along the length of the carbon nanotube, without fully cutting-apart the carbon nanotube. For instance, "mild" oxidizing chemistries can be utilized so as to selectively introduce hydroxyl and/or carboxyl surface moieties at desired regions without significantly cutting these sites or substantially damaging the other regions. For example, diazonium-based functionalization chemistries are sensitive to the local electron density and Fermi-level of the nanotube and therefore can be selectively used so as to functionalize certain of the zones without substantially altering other of the zones.

The foregoing description of the invention has been presented for purposes of illustration and description and is not intended to be exhaustive or to limit the invention to the precise form disclosed, and obviously many modifications and variations are possible in light of the above teaching.

EXEMPLARY EMBODIMENTS OF THE PRESENT INVENTION

Below are examples of particular embodiments of the present invention which illustrate the teachings herein. These exemplary embodiments are not intended to represent any limitation on the scope or means of the present invention, which may be embodied by any methods which are consistent with the present invention. Indeed, it is well-known in the art that a wide variety of methods and recipes exist for growing carbon nanotubes of varying lattice characteristics and also for attacking carbon nanotubes to etch or cut them to reduced size or for selectively chemically altering them. In general many of these recipes can be utilized with suitable adaptation to embody the teaching of the present invention.

Example 1

Growth Phase

Ethylene with Ammonia Dopant~Iron Pentacarbonyl Vapor

Catalyst Precursor
(Chem Phys Lett (2002); 359, 115-120)
  Growth is carried out in a sealed quartz, horizontal tube furnace reactor (D~2 cm; $L_{hot}$~20 cm) which is heated to an appropriate growth temperature (e.g., 850° C.)
  Gases are introduced directly into the reactor once the reactor is at temperature
    Pristine conditions are carried out with:
      1500 sccm Ar
      20 sccm of $C_2H_2$ bubbled through $Fe(CO_5)_{liquid}$
    Nitrogen-doping conditions are carried out with:
      1500 sccm Ar
      20 sccm of $C_2H_2$ bubbled through $Fe(CO_5)_{liquid}$
      30 sccm $NH_3$
  Growth is carried out for approximately 30 minutes total, following a repeating cycle of 30 seconds of nitrogen-doped growth conditions followed by 1.4 minutes of pristine growth conditions; both beginning and ending on a nitrogen-doped cycle.
  This will produce multizone carbon nanotubes with diameters on the order of 35 nm, and pristine sections of nanotubes on the order of 10 microns long spaced apart by sections of nitrogen-doped (non-pristine) nanotube sections on the order of 500 nm in length.
  This method grows carbon nanotubes (CNTs) on available, growth-compatible surfaces such as the reactor walls. The accessible yield of this method can be improved by providing additional surface area for growth.
    e.g., quartz wool may be added into the chamber as a growth surface with appropriate modifications to the gas flow rates and heating.
    e.g., flat surfaces (e.g., thermally stabilized mica flake) are advantageous for achieving well-controlled growth—the optimized yield and quality of the process can be improved for these types of micro-substrates by using fluidized bed reactors of design types which are well-known in the art.
  Nanotubes may be removed from the furnace walls by scraping and from other siliceous substrates by substrate etching (e.g., using hydrofluoric acid).
Upon removal from any growth substrate, the multizone carbon nanotubes are then subjected to the attack phase processing conditions.
Attack Phase: Caro's Acid Oxidation
(Nanotechnology (2005); 16, S539-S544)
  Multizone nanotubes are added to sulfuric acid (96%) and thoroughly stirred in the ratio of 1 mg nanotubes to 1 ml of sulfuric acid with temperature maintained approximately constant between 5-25° C.
  After thorough mixing, ammonium persulfate salt ($N_2H_8S_2O_8$) is added to the mixture in the quantity of 0.08 grams of ammonium persulfate per milliliter of sulfuric acid.
  This mixture is allowed to react at constant temperature under constant stirring for approximately 10 hours.
  The solution is then diluted and the nanotubes recovered using methods common in the art.

Example 2

Growth Phase

Xylene with Pyridine Dopant~Ferrocene Vapor Catalyst Precursor (CARBON (2010); 48, 3097-3102)
  Growth is carried out in a horizontal, two-stage quartz tube furnace reactor. Temperature in the first stage of the reactor is maintained at 280° C. and in the second (growth) stage of the reactor at 800° C.
  Vapors are injected into a gas stream at a controlled rate and carried along by gases into the reaction zone of the reactor.
    Pristine conditions are carried out with
      2000 sccm Ar
      400 sccm H2
      Xylene/Ferrocene solution (0.02 g ferrocene/1 ml xylene) is injected at a controlled rate of 0.4 ml (liquid) minute.
    Nitrogen-doping conditions are carried out with
      2000 sccm Ar
      400 sccm H2
      Pyridine/Ferrocene solution (0.02 g ferrocene/1 ml pyridine) is injected at a controlled rate of 0.4 ml (liquid) minute.
  Growth is carried out for approximately 30 minutes total, following a repeating cycle of 5 seconds of nitrogen-doped growth conditions followed by 30 seconds of pristine growth conditions; both beginning and ending on a nitrogen-doped cycle.
  This will produce multizone carbon nanotubes with diameters on the order of 25 nm; and pristine sections of nanotubes on the order of 15 microns long spaced apart by sections of nitrogen doped (non-pristine) nanotube sections on the order of 500 nm in length.
  In a preferred embodiment, an optional final growth step may be incorporated to oxidize the connection between the carbon nanotube and the growth catalyst particle by flowing only argon bubbled through water (to contain water vapor) into the furnace at growth temperature (typically for tens of seconds). This is particularly useful for high temperature processing techniques to reduce residual catalytic particle activity within the multizone nanotube materials.

In a preferred embodiment, an optional step may be performed after growth but before chemical attack etching steps in which the carbon nanotube materials are subjected to a non-oxidizing acid etching step (e.g., using concentrated hydrochloric acid) to remove residual catalyst nanoparticles. This is particularly useful in conjunction with the optional oxidation final step mentioned above and for processes where high-temperature gas-phase oxidation will be utilized where catalyst nanoparticles will catalyze oxidation rates of the carbon nanotube materials.

This method grows CNTs on available, growth-compatible surfaces such as the reactor walls. The accessible yield of this method can be improved by providing additional surface area for growth.

e.g., quartz wool may be added into the chamber as a growth surface with appropriate modifications to the gas flow rates and heating.

e.g., flat surfaces (e.g., thermally stabilized phyllosilicate flake, alumina flake, etc.) are advantageous for achieving well controlled growth. The optimized yield and quality of the process can be improved for these types of micro-substrates by using fluidized bed reactors of design types which are well-known in the art.[xiv]

Nanotubes may be removed from the furnace walls by scraping and from other siliceous substrates by substrate etching (e.g., hydrofluoric acid).

Upon removal from any growth substrate, the multizone carbon nanotubes are then subjected to the attack phase processing conditions.

Attack Phase:

(Nature (1993); 363, 520-522)

MZNT are placed into a horizontal sealed quartz reactor which is purged of oxygen with argon.

Carbon dioxide gas is flowed through the reactor at approximately 40 sccm while the furnace is ramped to 850° C.

Temperature is maintained with carbon dioxide flow for approximately 10 hours or more.

Carbon dioxide flow is then stopped and argon flow (50 sccm) initiated and then the furnace is allowed to cool to room temperature, whereupon the nanotubes can then be directly recovered in dry form.

Example 3

Growth Phase

VA-SWNT Growth~Substrate-Adhered Catalyst Precursor (ACS Nano (2011); 5, 6925-6934)

Catalytic growth substrates are prepared by deposition of approximately 10 nm of alumina and 1 nm of iron onto a growth substrate (e.g., silicon wafer).

Growth is carried out in a horizontal, quartz tube furnace reactor at reduced pressure (typically approximately 1.4 Torr). Temperature in the first stage of the reactor is maintained at 750° C.

Prior to injection of growth feedstock, the catalyst is reduced by thermally activated hydrogen species produced by a hot tungsten filament.[xv]

Vapors are injected into a gas stream at a controlled rate and carried along by gases into the reaction zone of the reactor.

Pristine conditions are carried out with a gas mixture of 0.5% $C_2H_2$, 0.5% $H_2O$, and 99% $H_2$ Nitrogen-doping conditions are conducted with a gas mixture of 0.5% $C_2H_3N$, 0.5% $H_2O$, and 99% $H_2$ Growth is carried out for approximately 30 minutes total, following a repeating cycle of 30 seconds of nitrogen-doped growth conditions followed by 1 minute of pristine growth conditions; both beginning and ending on a nitrogen doped cycle.

This will produce multizone single-walled carbon nanotubes with diameters on the order of 2 nm; and pristine sections of nanotubes spaced apart by sections of nitrogen-doped (non-pristine) nanotube sections.

In a preferred embodiment, an optional final growth step may be incorporated to oxidize the connection between the carbon nanotube and the growth catalyst particle by flowing only argon bubbled through water (to contain water vapor) into the furnace at growth temperature (typically for tens of seconds). This is particularly useful for high temperature processing techniques to reduce residual catalytic particle activity within the MZNT materials.

In a preferred embodiment, an optional step may be performed after growth but before chemical attack etching steps in which the carbon nanotube materials are subjected to a non-oxidizing acid etching step (e.g., using concentrated hydrochloric acid) to remove residual catalyst nanoparticles. This is particularly useful in conjunction with the optional oxidation final step mentioned above and for processes where high-temperature gas-phase oxidation will be utilized where catalyst nanoparticles will catalyze oxidation rates of the carbon nanotube materials.

This method grows CNTs primarily on catalytically-prepared growth substrate surface area.

The carbon nanotubes may then be directly removed from the growth substrate by typical methods (e.g., scraping, sonication, etc.).

Upon removal from any growth substrate, the multizone carbon nanotubes are then subjected to the attack phase processing conditions.

Attack Phase: Phosphomolybdic Acid Solution Attack (J. Mater. Chem. (2008); 18, 4056-4061)

MZNT are added to a solution of room temperature 10 mM $H_3PMo_{12}O_{40}$ in 0.1 M $H_2SO_4$ at approximately 0.01 mg of MZNTs per 1 ml of solution.

The MZNT suspension is then sonicated in a high intensity (e.g. cup-horn) sonicator for approximately one hour to suspend nanotube materials into solution and to enhance the rate of oxidative attack chemistry.

The solution is then diluted and the nanotubes recovered using methods common in the art.

Example 4

Growth Phase

Pressure Shift Growth

U.S. Pat. No. 7,157,068 "Varied morphology carbon nanotubes and method for their manufacture", Li et al., 2007.

A catalyst material includes a catalytic substrate comprising a sol-gel material or a mesoporous material impregnated with or having deposited thereon a metallic material, by providing a material surface in the reactor and placing the particles on the material surface; creating a substantially oxygen-free atmosphere in the reactor and controlling the pressure within the reactor; feeding at least one carbon source gas into the reactor; providing thermal energy to heat the reactor to a reaction temperature to cause the carbon source gas to form nucleated tubules in the presence of the particles and cause the initiation of tubule growth into carbon nanotubes; and feeding a mixture of gases comprising at least one promoter gas into the reactor to promote growth of carbon nanotubes.

This process establishes process conditions for the synthesis of carbon nanotubes that have either a hollow or a bamboo structure. This patent document defines conditions where hollow nanotube structures can be formed at low reactor pressures (~0.6 Torr), and under the same temperature and flow conditions but at high pressure, (~200 Torr) bamboo structured nanotubes are formed. While this patent document does not disclose the production of nanotubes with zones of varied morphology in the same nanotube, it is clearly possible to do so.

Upon removal from any growth substrate, the multizone carbon nanotubes are then subjected to the attack phase processing conditions.

Attack Phase:—Ultrasonic Chemical etching
"Fullerene Pipes", Science, VOL. 280, 22 May 1998, pp 1253-1256

MZNT are suspended in a mixture of concentrated sulfuric and nitric acids (3:1, 98% and 70%, respectively) at 40° C. and exposed to ultrasonication. This acid is known to exfoliate graphite. Attack by the collapse of cavitation bubbles in ultrasonication produces microscopic domains of high temperature, leading to localized sonochemistry that attacks the surface of the nanotubes, leaving an open hole in the tube wall. In bamboo-structured nanotubes, the wall of the nanotube is made up of multiple graphitic cones that nest in one another, somewhat like stacked cups. As such, the sidewall is made up of a plurality of these cone edges, or cup rims. The increased reactivity of these sites enables faster attack of the bamboo-structured nanotube segments compared to their hollow counterparts.

Example 5

Growth Phase

Temperature Shift Growth—Bromine Oxidation (Chem. Phys. Lett. (2001); 343, 33-38)

Catalytic growth substrates are prepared by deposition of approximately 30 nm of iron (e.g., by thermal evaporation) onto a silicon oxide substrate (e.g. ~300 nm of thermal oxide on silicon).

Growth is carried out in a sealed, horizontal, two-zone quartz tube furnace reactor (55 cm diameter) at atmospheric pressure. Temperature in the first stage of the reactor is maintained at a lower temperature (e.g., 750° C.). Temperature in the second stage of the reactor is maintained at a higher temperature (e.g., 950° C.). A movable boat is utilized with a mechanical feedthrough (e.g., magnetically coupled) to enable moving the boat in between zones during the growth process. The reactor is purged with argon prior to growth. Ideally the boat will be chemically inert (e.g., quartz) and have the lowest possible thermal mass.

The catalyst-bearing growth substrate is first activated by inserting the substrate into the hot zone and flowing 1000 sccm Ar and 100 sccm $NH_3$ into the furnace for 20 min Which zone will be determined by desired carbon nanotube diameter range with lower temperatures favoring smaller growth diameter.

Growth is carried out for approximately thirty minutes under 30 sccm $C_2H_2$ and 1000 sccm Ar with the growth substrate in either the high-temperature or low temperature zone. High lattice quality growth is carried out in the high temperature zone and low lattice quality growth is carried out in the low temperature zone.

This will produce multi-zone multi-walled carbon nanotubes with high lattice quality nanotube sections spaced apart by low lattice quality nanotube sections.

This method grows CNTs primarily on catalytically-prepared growth substrate surface area.

The carbon nanotubes may then be directly removed from the growth substrate by typical methods (e.g., scraping, sonication, etc.).

It is notable that a similar type of growth can be achieved without utilizing a moving growth stage in a multi-zone static temperature furnace but rather by utilizing a radiant heat furnace with low thermal mass which is capable of ramping between different temperatures very quickly.

Upon removal from any growth substrate, the multizone carbon nanotubes are then subjected to the attack phase processing conditions. Alternatively the substrate containing the nanotubes may be immersed whole into the attack phase solution.

Attack Phase:
(Carbon (2002); 40, 81-85)

MZNTs are gently ultrasonicated in a solution of saturated bromine water briefly (until visibly dispersed), then the solution is stirred at 90° C. for approximately 4 hours: 1 mg of MZNTs per 2 ml bromine water. Optimum treatment time will depend upon the carbon nanotube diameter and growth time and conditions for the different zone types.

The bromine-treated MZNTs are then collected utilizing standard methods.

The collected bromine-treated MZNTs are then oxidized in air at 530° C. for 1 hour. Optimum treatment time will depend upon the carbon nanotube diameter and growth time for the different zone types.

The carbon nanotube product is then collected as a dry powder using standard methods.

Some Exemplary Applications for Length-Selected Carbon Nanotubes

As noted above, length-tailored carbon nanotubes may be utilized in a variety of applications. By way of example but not limitation, the applications discussed below illustrate specific usages of the length-tailored carbon nanotubes produced by the foregoing process, and the tailored utilization of this process to enable and optimize these applications.

1. Optically Absorbing Materials: It is well understood that carbon nanotubes couple to the electrodynamic field via several different mechanisms and, furthermore, that coupling of specific electromagnetic spectrum wavelengths via charge density waves (sometimes called plasma waves, Lagmuir oscillations, plasmons, etc.) depends strongly upon the length of the carbon nanotube.[xvi] This can be utilized to create optically functional materials such as dyes, optical filters, optical limiters, etc. Such dyes have particular utility in being extremely resistant to bleaching or fading processes, and furthermore these dyes can be stabilized by encapsulating them in shells of inert material (e.g., silica)[xvii] or in inert composite matrices to prevent damage to them. These type of colorants can be utilized in optical filters, including optical filters designed to withstand significant energy inputs (e.g., laser filters). It is also known that dispersion of carbon nanotubes into matrices that undergo non-linear scattering, or absorption processes, can be utilized to produce high-performance optical limiters. The length-tailored nanotubes produced by the present invention can provide significant wavelength-selected action for such applications. In one example, length-tailored nanotubes are dispersed into a liquid matrix to create scattering microbubbles upon exposure to intense laser radiation.[xviii] In another example, length-tailored nanotubes can be utilized in the presence of non-linear absorbing materials (e.g., reverse saturable absorbers) to tune and enhance the non-linear absorption process (e.g., lead phthalocyanines anchored to the nanotube in the tip region). In other circumstances, length tailored nanotubes can be adhered to a substrate surface, or embedded into a matrix, and utilized as selective thermal emitters. The performance of such emitters in a variety of environments can be enhanced by encapsulation with a stabilizing inert material.

2. Optically Active Devices And Architectures: The high-aspect ratio morphology of carbon nanotubes enables them to act as "plasmonic antennas" and significantly concentrate electric fields at the tips of such architectures. This effect can be directly utilized in applications such as solar cells to enhance the efficiency of the device by applying the carbon nanotubes to the surface of the cell.[xix] These architectures can also be utilized to enhance non-linear effects in surrounding materials through the field concentration effects. In a particular embodiment, carbon nanotubes may be produced with two length-defined sections joined in the middle by a relatively small "weak link" section. In this case the nanotubes can be deposited onto a substrate and then the weak link section etched to produce a well-defined antenna architecture with a central gap. Non-linear materials (e.g., Kerr materials) introduced into this gap can then be utilized to create a device which shows highly non-linear device performance in the presence of applied fields, and can be utilized to create optically responsive structures which are tunable through the application of static or low-frequency fields. Non-linear materials can be introduced locally to the gap between the nanotubes through methods such as electrophoretic deposition of nanoparticles. Alternatively, the architecture may be completely overcoated by non-linear materials (e.g., a solid film or liquid layer).

3. Biological Applications: It is known in the literature that the biological impact of carbon nanotubes depends upon the length and surface chemical identity of the nanotube.[xx] Therefore, length-tailored carbon nanotubes of the types taught above may be utilized to enable enhanced performance of carbon nanotubes for biological and pharmaceutical applications of carbon nanotubes in various roles such as diagnostic taggants (tags) and/or therapeutic transportation.

4. Composites: The usage of carbon nanotubes within composites is well-known in the art.[xxi] It will be recognized by one skilled in the art that usage of controlled-length carbon nanotubes can be utilized to enable optimized performance from the composite by utilizing carbon nanotubes with tailored length characteristics. For instance, mechanical optimization can be achieved with nanotubes which are tuned to the critical length for the composite system,[xxii] or dielectric properties can be tuned by controlling the length of nanotube additives within the system.[xxiii] Furthermore, carbon nanotubes with tailored end functionality (e.g., beveled ends with substantial oxygen functionality) can be utilized to create significantly more interaction between the matrix and the nanotube at the end-region versus the rest of the length of the nanotube. This can be utilized to tune and enhance the performance of composites based upon these specialized types of carbon nanotubes versus other types of composite systems.

5. Self-Assembled Architectures: Carbon nanotubes with tailored length and tailored end-versus-sidewall characteristics can be utilized to manufacture precursor materials for carbon nanotube-based architectures of the type described in the prior art.[xxiv]

Modifications

It is to be understood that the present invention is by no means limited to the particular constructions herein disclosed and/or shown in the drawings, but also comprises any modifications or equivalents within the scope of the invention.

Endnotes

References are provided as descriptive examples relating to the teaching of this patent and represent some of the knowledge typical of one skilled in the art and are not exhaustive nor is this list of references indicative of limitation to the scope of this teaching and methods herein.

[i] D. Bom, et al.; "Thermogravimetric Analysis of the Oxidation of Multiwalled Carbon Nanotubes: Evidence for the Role of Defect Sites in Carbon Nanotube Chemistry." Nano Letters (2002); 2, 615-619

G. McKee, et al.; "Thermogravimetric Analysis of Synthesis Variation Effects on CVD Generated Multiwalled Carbon Nanotubes." J. Phys. Chem. B (2006); 110, 1179-1186

George Bepete, et al.; "The use of aliphatic alcohol chain length to control the nitrogen type and content in nitrogen doped carbon nanotubes." Carbon (2013); 52, 316-325

Cheol Jin Lee, et al.; "Synthesis of bamboo-shaped carbon-nitrogen nanotubes using C2H2-NH3-Fe(CO)5 system." Chemical Physics Letters (2002); 359, 115-120

Antal A. Koós, et al.; "Effect of the experimental parameters on the structure of nitrogen-doped carbon nanotubes produced by aerosol chemical vapour deposition." Carbon (2009); 47, 30-37

Cheol Jin Lee, et al.; "Temperature effect on the growth of carbon nanotubes using thermal chemical vapor deposition." Chemical Physics Letters (2001); 343, 33-38

C. P. Ewels & M. Glerup; "Nitrogen Doping in Carbon Nanotubes." Journal of Nanoscience & Nanotechnology (2005); 5, 1345-1363

[ii] Cheol Jin Lee, et al.; "Temperature effect on the growth of carbon nanotubes using thermal chemical vapor deposition." Chemical Physics Letters (2001); 343, 33-38

J. Liu, et al.; "Temperature and Flow Rate of NH3 Effects on Nitrogen Content and Doping Environments of Carbon Nanotubes Grown by Injection CVD Method." J. Phys. Chem. B (2005); 109, 15769-15774

O. A. Nerushev, et al.; "The temperature dependence of Fe-catalysed growth of carbon nanotubes on silicon substrates," Physica B (2002); 323, 51-59

C. Bah Singh, "Raman spectroscopy study of growth of multiwalled carbon nanotubes using Plasma Enhanced Chemical vapour deposition." ICONSET (2011);

S S Mahajan, et al.; "Monitoring structural defects and crystallinity of carbon nanotubes in thin films." Pramana, J. Phys. (2010); 74, 447-455;

[iii] Y.-Q. Xu, et al.; "Vertical Array Growth of Small. Diameter Single-Walled Carbon Nanotubes." J. Am. Chem. Soc., (2006); 128, 6560-6561

M Meyyappan, et al.; "Carbon nanotube growth by PECVD: a review." Plasma Sources Sci. Technol. (2003); 12, 205-216;

[iv] T-H. Fang, et al.; "Effects of gas composition on the growth of multi-walled carbon nanotube." Applied Surface Science (2007); 253, 8749-8753

A. R. Biris, et al.; "Effect of hydrogen on the growth and morphology of single wall carbon nanotubes synthesized on a FeMo/MgO catalytic system." Physics Letters A (2008); 372, 3051-3057

C. L. Pint, et al.; "Supergrowth of Nitrogen-Doped Single-Walled Carbon Nanotube Arrays: Active Species, Dopant Characterization, and Doped/Undoped Heterojunctions." ACS Nano (2011); 5, 6925-6934

Y. Hao, et al.; "The effect of hydrogen on the formation of nitrogen-doped carbon nanotubes via catalytic pyrolysis of acetonitrile." Chemical Physics Letters (2003); 380; 347-351

S. H. Lin, et al.; "Effect of ammonia on the growth of carbon nanotubes." J. Nanosci. Nanotechnol. (2008); 8, 2647-2650

E. G. Wang, et al.; "Optical emission spectroscopy study of the influence of nitrogen on carbon nanotube growth." Carbon (2003); 41, 1827-1831

[v] J. Liu, et al.; "Temperature and Flow Rate of NH3 Effects on Nitrogen Content and Doping Environments of Carbon Nanotubes Grown by Injection CVD Method." J. Phys. Chem. B (2005); 109, 15769-15774

[vi] C. P. Ewels & M. Glerup; "Nitrogen Doping in Carbon Nanotubes." Journal of Nanoscience & Nanotechnology (2005); 5, 1345-1363

[vii] C. L. Pint, et al.; "Supergrowth of Nitrogen-Doped Single-Walled Carbon Nanotube Arrays: Active Species, Dopant Characterization, and Doped/Undoped Heterojunctions." ACS Nano (2011); 5, 6925-6934

E. Xu, et al.; "Doped carbon nanotube array with a gradient of nitrogen concentration." Carbon (2010); 48, 3097-3102

[viii] M. Q. Tran, et al.; "Thermal oxidative cutting of multi-walled carbon nanotubes." Carbon (2007); 45, 2341-2350

D. Bom, et al.; "Thermogravimetric Analysis of the Oxidation of Multiwalled Carbon Nanotubes: Evidence for the Role of Defect Sites in Carbon Nanotube Chemistry." Nano Letters (2002); 2, 615-619

G. McKee, et al.; "Thermogravimetric Analysis of Synthesis Variation Effects on CVD Generated Multiwalled Carbon Nanotubes." J. Phys. Chem. B (2006); 110, 1179-1186

S. C. Tsang, et al.; "Thinning and Opening of Carbon Nanotubes by Oxidation Using Carbon Dioxide." Nature (1993); 362, 520-522

[ix] K. J. Ziegler, et al.; "Cutting single-walled carbon nanotubes." Nanotechnology (2005); 16, 5539

P. X. Hou, et al.; "Multi-step purification of carbon nanotubes." Carbon (2002); 40, 81-85

C. Warakulwit, et al.; "Controlled purification, solubilisation and cutting of carbon nanotubes using phosphomolybdic acid." J. Mater. Chem. (2008); 18, 4056-4061

V. Datsyuk, et al. "Chemical oxidation of multiwalled carbon nanotubes." Carbon (2008); 46, 833-840.

[x] Y. Wang, et al.; "Etching and cutting of multi-walled carbon nanotubes in molten nitrate." Corrosion Science (2011); 53, 3764-3770

[xi] N. Rubio, et al.; "Ball-Milling Modification of Single-Walled Carbon Nanotubes: Purification, Cutting, and Functionalization." small (2011); 7, 665-674

K. C. Park, et al.; "Inter-collisional cutting of multi-walled carbon nanotubes by high-speed agitation." J. Phys. & Chem. Sol. (2008); 69, 2481-2486

A. Kukovecz, et al.; "Long-time low-impact ball milling of multi-wall carbon nanotubes." Carbon (2005); 43, 994-1000

Z. Konya, et al. "End morphology of ball milled carbon nanotubes." Carbon (2004); 42, 2001-2008

N. Pierard, et al.; "Production of Short Carbon Nanotubes with Open Tips by Ball Milling." Chem. Phys. Lett. (2001); 335, 1-8

[xii] M. Q. Tran, et al.; "Thermal oxidative cutting of multi-walled carbon nanotubes." Carbon (2007); 45, 2341-2350

D. Bom, et al.; "Thermogravimetric Analysis, of the Oxidation of Multiwalled Carbon Nanotubes: Evidence for the Role of Defect Sites in Carbon Nanotube Chemistry." Nano Letters (2002); 2, 615-619

G. McKee, et al.; "Thermogravimetric Analysis of Synthesis Variation Effects on CVD Generated Multiwalled Carbon Nanotubes," J. Phys. Chem. B (2006); 110, 1179-1186

C. P. Ewels & M. Glerup; "Nitrogen Doping in Carbon Nanotubes." Journal of Nanoscience & Nanotechnology (2005); 5, 1345-1363

George Bepete, et al.; "The use of aliphatic alcohol chain length to control the nitrogen type and content in nitrogen doped carbon nanotubes." Carbon (2013); 52, 316-325

[xiii] Y. Wang, et al.; "Microwave-induced rapid chemical functionalization of single-walled carbon nanotubes." Carbon (2005); 43, 1015-1020

C.-J. Ko, et al.; "Highly efficient microwave-assisted purification of multiwalled carbon nanotubes." Microelectronic Engineering (2004); 73-74, 570-577

F.-H. Ko, et al.; "Purification of multi-walled carbon nanotubes through microwave heating of nitric acid in a closed vessel." Carbon (2005); 43, 727-733

W. Lin, et al.; "Microwave Makes Carbon Nanotubes Less Defective." ACS Nano (2010); 4, 1716-1722

E. Vazquez & M. Prato; "Carbon Nanotubes and Microwaves: Interactions, Responses, and Applications." ACS Nano (2009); 3, 3819-3824

[xiv] Q. Zhang, et al.; "Vertically aligned carbon nanotube arrays gown on a lamellar catalyst by fluidized bed catalytic chemical vapor deposition." Carbon (2009); 47, 2600-2610

C. Pint, et al.; "Synthesis of High Aspect-Ratio Carbon Nanotube "Flying Carpets" from Nanostructured Flake Substrates." Nano Lett. (2008); 8, 1879-83

[xv] Y.-Q. Xu, et al.: "Vertical Array Growth of Small Diameter Single-Walled Carbon Nanotubes." J. Am. Chem. Soc., (2006); 128, 6560-6561

[xvi] Y. Kornyushin & M. Ya. Amusia; "Oil the frequencies of collective electron oscillations in nanotubes." Contemporary Physics (2001); 42, 159-165

Y. Wang, et al.; "Receiving and transmitting light-like radio waves: Antenna effect in arrays of aligned carbon nanotubes." Appl. Phys. Lett. (2004); 85, 2607

P. J. Burke, et al.; "Quantitative theory of nanowire and nanotube antenna performance." IEEE Trans. Nanotech. (2006); 5, 314-334

K. Kempa, et al.; "Carbon Nanotubes as Optical Antennae," Adv. Mater. (2007); 19, 421-426

[xvii] E. Whitsitt & A. Barron; "Silica Coated Single Walled Carbon Nanotubes." Nano Letters (2003); 3, 775-778

R. Colorado & A. Barron; "Silica-Coated Single-Walled Nanotubes: Nanostructure Formation." Chem. Mater. (2004); 16, 2691-2693

J. T. Han, et al.; "Noncovalent titania wrapping of single-walled carbon nanotubes for environmentally stable transparent conductive thin films." J. Mater. Chem. (2010); 20, 8557-8562

[xviii] X. Sun, et al.; "Broadband optical limiting with multi-walled carbon nanotubes." Appl. Phys. Lett. (1998); 3632-3634

Y. Chen, et al.; "Carbon Nanotube-Based Functional Materials for Optical Limiting." Journal of Nanoscience and Nanotechnology (2007); 7, 1268-1283

[xix] S. Pillai, et al.; "Surface plasmon enhanced silicon solar cells." J. Appl. Phys. (2007); 101, 093105

M. Yang, et al.; "Absorption Enhancements in Plasmonic Solar Cells Coated with Metallic Nanoparticles."; Plasmonics (2013)

[xx] K. Kostarelos; "The Long and Short of Carbon Nanotube Toxicity." Nature Biotechnology (2008); 26, 774-776

H. Ali-Boucetta, et al.; "Asbestos-like Pathogenicity of Long Carbon Nanotubes Alleviated by Chemical Functionalization," Angew. Chem. Int. Ed. (2013); 52, 2274-2278

[xxi] L. Bokobza; "Multiwall carbon nanotube elastomeric composites: A review." Polymer (2007); 48, 4907-4920

O. Breuer, O. & U. Sundararaj; "Big returns from small fibers: A review of polymer/carbon nanotube composites." Polym Compos (2004); 25, 630-645

S. R. Bakshi, et al.; "Carbon nanotube reinforced metal matrix composites—a review." International Materials Reviews (2010); 55, 1-64

P. J. F. Harris; "Carbon nanotube composites." International Materials Reviews (2004); 4, 31-43

[xxii] F. Delale & H. Wan; "Critical Fiber Length for Load Transfer in Carbon Nanotube (CNT) Reinforced Composites." ASME Conf. Proc.: IMECE2004-60718 (2004); 389

P. M. Ajayan, et al.; "Single-walled carbon nanotube-polymer composites; strength and weakness." Advanced Materials (2000); 12, 750-753.

S. J. V. Frankland, et al.; "Molecular, simulation of the influence of chemical cross-links on the shear strength of carbon nanotube-polymer interfaces." The Journal of Physical Chemistry B (2002); 106, 3046-3048.

J. N. Coleman, et al.; "High performance nanotube-reinforced plastics: understanding the mechanism of strength increase." Advanced Functional Materials (2004); 14, 791-798.

[xxiii] K. Kempa; "Dielectric function of media based on conductive particles"; PHYSICAL REVIEW B (2006); 74, 033411

[xxiv]
Provisional Patent Application: 61/272,051 (2009)
U.S. patent application Ser. No. 12/854,763 (2010)
U.S. patent application Ser. No. 13/045,047 (2011)

What is claimed is:

1. A method for producing an architecture of carbon nanotubes, wherein each carbon nanotube has a specific length and a reactive end, said method comprising:

producing carbon nanotubes having at least two types of zones along their length, wherein each zone type has a characteristic structure that confers specific properties;

processing said carbon nanotubes to selectively attack one zone type more aggressively than another zone type, whereby to segment the carbon nanotubes into carbon nanotubes having specific lengths and reactive ends; and joining the segmented carbon nanotubes with each other at their reactive ends, whereby to produce the architecture of carbon nanotubes.

2. The method of claim 1 wherein said characteristic structure is at least one from the group consisting of the type and concentration of defects.

3. The method of claim 1 wherein said processing utilizes at least one of a chemical and an environment.

4. The method of claim 2 wherein said defects are caused by the incorporation of topological defects, comprising non-hexagonally-bonded regions.

5. The method of claim 2 wherein said defects are caused by the incorporation of non-carbon atomic species.

6. The method of claim 5 wherein said non-carbon atomic species comprises nitrogen atoms.

7. The method of claim 5 wherein said non-carbon atomic species comprises at least one from the group consisting of boron, phosphorus and sulfur.

8. The method of claim 1 wherein said processing attacks a zone type having a higher defect concentration.

9. The method of claim 8 wherein said processing creates oxidizing conditions.

10. The method of claim 9 wherein said oxidizing conditions are created in a gas or plasma phase employing at least one of air, oxygen, ozone, halogens, water, $CO_2$ and acids.

11. The method of claim 9 wherein said oxidizing conditions are created in a solution or liquid phase employing at least one of peroxides, suboxides, acids and metal salts.

12. The method of claim 11 wherein said peroxides and suboxides comprise at least one from the group consisting of alkali permanganates, hydrogen peroxide, hypochlorites, hypochlorates, and chlorates, bromates, fluorates, iodates, and chromates.

13. The method of claim 11 wherein said metal salts comprise at least one from the group consisting of Cerium (IV) and Lead (IV) and their mixtures.

14. The method of claim 11 wherein said acids comprise at least one from the group consisting of nitric acid, phosphomolybdic acid, sulfuric acid, and their mixtures.

15. The method of claim 9 wherein said oxidizing conditions are created by the use of at least one from the group consisting of bromine, piranha etchants, sulfuric acid and ammonium persulfate mixtures, and ammonium hydroxide and hydrogen peroxide mixtures (RCA etchant).

16. The method of claim 9 wherein said processing comprises molten salt oxidation.

17. The method of claim 3 wherein said environment comprises at least one from the group consisting of mechanical shear forces and ultrasonication.

18. The method of claim 17 wherein mechanical shear forces comprise at least one from the group consisting of milling and grinding.

19. The method of claim 3 wherein said environment comprises at least one from the group consisting of heating, electromagnetic radiation and optical radiation.

20. The method of claim 1 wherein said carbon nanotubes are produced using a chemical vapor deposition process and said carbon nanotubes grow vertically aligned from a substrate.

21. An architecture of carbon nanotubes comprising a combination of two types of carbon nanotubes, with each type of carbon nanotube having a tailored length;
- wherein the first type of carbon nanotube comprises reactive zones of specific reactive functional groups positioned periodically along its length, and a substantially nonreactive surface between the reactive zones of specific reactive functional groups;
- wherein the second type of carbon nanotubes comprises reactive zones of specific reactive functional groups positioned periodically along its length, and a substantially nonreactive surface between the reactive zones of specific reactive functional groups;
- wherein the specific reactive functional groups in the reactive zones of the first type of carbon nanotubes are different from the specific reactive functional groups in the reactive zones of the second type of carbon nanotubes; and
- further wherein the specific reactive functional groups in the reactive zones of the first type of carbon nanotubes are reactive with the specific reactive functional groups in the reactive zones of the second type of carbon nanotubes.

22. The architecture of carbon nanotubes of claim 21 wherein said characteristic structure is at least one from the group consisting of the type and concentration of defects.

23. The architecture of carbon nanotubes of claim 21 wherein the reaction between the reactive zones of the first type of carbon nanotubes and the reactive zones of the second type of carbon nanotubes forms a chemical bond.

24. A method for producing an architecture of carbon nanotubes comprising a combination of two types of carbon nanotubes, with each type of carbon nanotube having a tailored length, said method comprising:
- producing a first type of carbon nanotube, wherein the first type of carbon nanotube comprises reactive zones of specific reactive functional groups positioned periodically along its length, and a substantially nonreactive surface between the reactive zones of specific reactive functional groups;
- producing a second type of carbon nanotube, wherein the second type of carbon nanotube comprises reactive zones of specific reactive functional groups positioned periodically along its length, and a substantially nonreactive surface between the reactive zones of specific reactive functional groups;
- wherein the specific reactive functional groups in the reactive zones of the first type of carbon nanotubes are different from the specific reactive functional groups in the reactive zones of the second type of carbon nanotubes; and
- further wherein the specific reactive functional groups in the reactive zones of the first type of carbon nanotubes are reactive with the specific reactive functional groups in the reactive zones of the second type of carbon nanotubes; and
- reacting the specific reactive functional groups in the reactive zones of the first type of carbon nanotubes with the specific reactive functional groups in the reactive zones of the second type of carbon nanotubes, whereby to produce the architecture of carbon nanotubes.

* * * * *